United States Patent [19]

Fogelberg et al.

[11] 4,289,816

[45] Sep. 15, 1981

[54] PROCESS FOR IMPROVED GLASS ARTICLE COATING, AND SUCH COATED ARTICLES

[75] Inventors: Clement V. Fogelberg, Arvada; Joseph H. Romig, Boulder, both of Colo.

[73] Assignee: LAM Partnership, Denver, Colo.

[21] Appl. No.: 126,584

[22] Filed: Mar. 3, 1980

Related U.S. Application Data

[63] Continuation-in-part of Ser. No. 911,017, May 30, 1978, abandoned.

[51] Int. Cl.$^3$ .................... B05D 3/02; C03C 17/23; C03C 17/32
[52] U.S. Cl. .................... 428/35; 428/432; 427/226; 427/407.2; 427/416; 427/417; 427/419.5; 65/60 D
[58] Field of Search ............... 427/165, 168, 226, 110, 427/383.5, 419.2, 419.5, 419.6, 419.8, 100, 74, 407.2, 416, 417; 65/60 C, 60 D; 428/35, 426, 432

[56] References Cited

U.S. PATENT DOCUMENTS

| | | | |
|---|---|---|---|
| 2,617,741 | 11/1952 | Lytle | 428/432 |
| 2,617,742 | 11/1952 | Olsen | 428/432 |
| 2,662,035 | 12/1953 | Levi | 428/432 |
| 2,791,521 | 5/1957 | Jaffe | 428/432 |
| 3,323,889 | 6/1967 | Carl et al. | 65/60 R |
| 3,357,857 | 12/1967 | Provisor et al. | 428/432 |
| 3,694,299 | 9/1972 | Wagner | 428/34 |
| 3,944,683 | 5/1976 | Church et al. | 427/226 |
| 3,984,591 | 10/1976 | Plumat et al. | 427/165 |
| 4,191,585 | 3/1980 | Jaunarajs | 106/99 |

*Primary Examiner*—Ralph S. Kendall
*Attorney, Agent, or Firm*—O'Rourke & Harris

[57] ABSTRACT

A method for "hot end" coating of vitreous articles, and particularly glassware such as bottles, with zinc oxide and magnesium oxide coatings from aqueous solutions of organic and inorganic zinc compounds, magnesium compounds, and mixtures thereof. Particularly useful are zinc acetate and magnesium acetate, which are applied to the vitreous surface at an elevated temperature, and preferably between about 425° C. and 650° C., to evaporate the water from the solution and pyrolytically decompose the metal compound or compounds to form refractory oxide coatings which are transparent and adherent, and articles coated by such a method.

43 Claims, No Drawings

PROCESS FOR IMPROVED GLASS ARTICLE COATING, AND SUCH COATED ARTICLES

RELATED APPLICATION

This application is a continuation-in-part application of copending application, Ser. No. 911,017, entitled "Process for Improved Vitreous Article Coating and Such Coated Articles", filed May 30, 1978 now abandoned.

BACKGROUND OF THE INVENTION

1. Field of the Invention

The present invention relates generally to improved methods for forming "hot end" coatings for vitreous articles such as glassware, and more particularly to new and improved methods for forming zinc oxide and magnesium oxide "hot end" coatings upon glassware from aqueous based solutions, and to articles so coated.

2. Description of the Prior Art

The desirability of forming refractory coatings on vitreous surfaces, such as glass, and particularly upon glassware such as bottles, is well known. Pristine glass is theoretically an extremely strong substance. However, when, for example, glassware is subjected to high speed packing and processing machines and normal use in which glass is caused to rub against glass, scratches, abrasions, and other physical damage rapidly degrades the surface of the glass thereby providing sites for initiation of failure throughout the glass. Also, glass is subject to attack by various atmospheric constituents, particularly moisture. Accordingly, it has been an accepted practice in the production of glassware to form a refractory, so-called "hot end" coating upon the newly formed glass, usually at or before the annealing lehr while the glassware is at an elevated temperature. After formation of the refractory "hot end" coating, it is conventional practice to thereafter apply a lubricious "cold end" coating at lower temperatures. "Cold end" coatings conventionally include, for instance, waxy polyethylene, fatty acids, beeswax, and other such lubricious compositions either alone or in combination. Neither the "hot end" coating or "cold end" coating is protective, and alone provides little protection against scratching by a similarly coated vitreous article.

The "hot end" coatings, to which the present invention pertains, display particular requirements which distinguish such "hot end" coatings from a number of other coatings previously employed upon glass for various purposes. As an example, thick coatings of tin oxide and magnesia have been applied to, for instance, electrical insulators. Other thick coatings of tin oxide have been applied to provide electrical conductivity for defrosting of glass surfaces by employing the tin oxide coating as a resistance element. Semi-transparent, colored coatings have been utilized for decorative purposes and, in some instances, for tinting of glass.

"Hot end" coatings have a number of requirements not met by many glass coatings. Typically, such coatings should be non-toxic as a coating, and also are desirably formed from compositions which are not in themselves toxic and which do not form toxic by-products. The coatings formed should not change the appearance of the glassware, i.e., should be colorless and substantially free of iridescence. Contrary to the purpose of certain other glass coatings, "hot end" coatings should have high electrical resistance to avoid galvanic action with container caps and moisture which leads to unsightly cap corrosion and/or increased torque requirements. Since glassware is formed at high rates, coatings must be conveniently applied and utilize relatively economical solvents and compounds. Further, "hot end" coatings must be resistant to normal handling and processing, and must tenaciously adhere to the glass and provide a suitable base for lubricious "cold end" coating.

Thus, it will be recognized that "hot end" coatings for glassware are a well recognized group of materials having characteristics and requirements distinct from other glass coatings.

Currently, "hot end" coatings are generally tin oxide or titanium oxide, formed from vapors of anhydrous tin or titanium tetrachloride or from aqueous solutions of such compounds. However, previously "hot end" coatings of tin, titanium or zirconium oxide have also been formed from organic compounds applied in or from organic solutions.

A number of prior art discussions exist concerning the various coatings. For instance, U.S. Pat. No. 2,165,819, issued July 11, 1939, discloses an electrical insulator of magnesium titanate suitable for formation on ceramic substances such as condensors. Magnesium titanate is disclosed as being suitable for a narrow, and quite specific coating purpose, but does not correlate with the requirements of a "hot end" coating.

U.S. Pat. No. 3,323,889, issued June 6, 1967, discloses a coating system for the purpose of the instant invention, but involves the use of titanium oxide as a "hot end" coating applied from an organic solvent solution in conjunction with relatively conventional "cold end" coatings. Organic solvents are expensive, often flammable, i.e., as is tetraisopropyl alcohol and cause objectionable pollution of the atmosphere. However, U.S. Pat. No. 3,323,889 is pertinent in setting forth many of the requirements of a "hot end" coating.

U.S. Pat. No. 3,450,574, issued June 17, 1969, is concerned with the preparation of a magnesia coating on refractory bodies. Preferable, the patent teaches the formation of a thin film of metal under reducing conditions and thereafter providing oxidizing conditions to form the oxide. Sintering techniques are also disclosed. Clearly this patent does not pertain to "hot end" coatings contemplated by the instant invention.

U.S. Pat. No. 3,516,811, issued June 23, 1970, primarily discloses apparatus for applying "hot end" coatings in laminar flow conditions, but also contains a fairly comprehensive listing of various prior art patents dealing with "hot end" and "cold end" coatings.

Typical of the hot end coatings discussed by U.S. Pat. No. 3,516,811 is that of U.S. Pat. No. 3,561,940, issued Feb. 9, 1971, which concerns the formation of tin oxide coatings by the pyrolytic composition of anhydrous stannic tetrachloride vapors in a moisture-free carrier gas. While tin oxide is a desirable and workable "hot end" coating, the by-products of the pyrolytic decomposition include hydrochloric acid (upon hydrolysis with atmospheric moisture) which presents serious problems with regard to attack of surrounding equipment and pollution of the atmosphere. Such installations may require expensive scrubbing equipment to remove the unused stannic tetrachloride and hydrochloric acid from the exhaust gases.

U.S. Pat. No. 3,694,299, issued Sept. 26, 1972, discloses a means for fusing glass sheets together utilizing an organo-metallic film forming solution in which the metallic constituent may include magnesium. However, the solution utilizes volatile and combustible solvents as well as resins which would be entirely inappropriate for use in a "hot end" coating composition for the reasons discussed above.

U.S. Pat. No. 3,711,322, issued Jan. 16, 1973, discloses organic solvent based compositions utilizing two metal compounds, one of which may be a magnesium compound such as magnesium acetate, to form semi-transparent, colored metal oxide coatings. For numerous reasons including transparency, color, organic solvents, etc., such coatings would not be useful as "hot end" coatings.

U.S. Pat. No. 3,847,583, issued Nov. 12, 1974, similarly discloses the use of two metal compounds dissolved in an organic solvent to form coatings. Titanium oxide and, it is believed, tin oxide, are discussed, and specific mention is made that alkali and alkali earth oxides are not operable to form pyrolytically induced oxide coatings.

U.S. Pat. No. 3,926,103, issued Dec. 16, 1975, discloses a recovery system for spray solutions of tin compounds.

Finally, U.S. Pat. No. 3,984,591, issued Oct. 5, 1976, discloses the formation of metallic oxide coatings from metallic salts utilizing, as a critical feature of the invention, aprotic solvents of specified dipolar moments which would be inappropriate for "hot end" coatings. Mention is made of spraying aqueous solutions, but such coatings are characterized as being readily removed in the form of dust by passing a finger over the coating. "Protective" coatings are taught to be tin oxide, zirconium oxide and titanium oxide.

Thus, on the basis of the above prior art, the only workable "hot end" coatings are those involving pyrolytic decomposition from objectionable organic solvents or from halides. In both cases, objectionable byproducts in the form of exhaust fumes are presented. The better, more economical coatings involve pyrolytic decomposition of stannic tetrachloride with the resulting formation of hydrochloric acid.

SUMMARY OF THE INVENTION

The present invention, which provides a heretofore unrecognized improvement over previous methods for forming "hot end" coatings on glassware, involves pyrolytic decomposition of aqueous based solutions of zinc compounds, magnesium compounds and mixtures thereof which, directly or indirectly, form zinc oxide, magnesium oxide and mixtures thereof upon glassware heated above about 425° C., and preferably between 425°–650° C. Particularly, zinc acetate and magnesium acetate provide high quality coatings with innocuous byproducts, though other zinc and magnesium compounds have also been found to be operable.

Accordingly, an object of the present invention is to provide a new and improved coating method and coating for glassware which adheres strongly to the glassware and does not substantially alter the appearance of the glassware.

Another object of the present invention is to provide a new and improved coating method and coating for glassware which displays an affinity for "cold end" coatings and provides both wet and dry lubrication in combination with such "cold end" coatings.

Yet another object of the present invention is to provide a new and improved coating method and coating for glassware which is of low electrical conductivity.

Still another object of the present invention is to provide a new and improved coating method and improved coating for glassware which coating is non-toxic.

Still yet another object of the present invention is to provide a new and improved coating method and coating for glassware which is applicable as a substantially aqueous solution.

These and other objects and advantages of the present invention will be apparent from the following description of the invention.

DETAILED DESCRIPTION OF THE INVENTION

According to the present invention, "hot end" coatings of magnesium oxide, zinc oxide and mixtures thereof are formed on vitreous substances such as glassware by applying an aqueous solution of such compounds having specific properties to glassware heated to an elevated temperature, i.e., above 400° C. to 450° C., and preferably below 650° C. Typically, such surfaces are not heated above about 700° C., but in specific instances may be heated to higher temperatures while providing at least operable results.

Many of the advantages of the instant invention accrue from the use of aqueous bases solutions of the zinc and magnesium compounds. Essentially, the compounds must be sufficiently water soluble zinc and magnesium compounds to provide reasonable coating concentrations in solution. The compounds are dissolved in a water carrier and are sprayed upon hot glassware, preferably in the form of a mist or fine spray of the aqueous solution. It is also important that the compunds decompose to zinc oxide and/or magnesium oxide at the temperatures existing on the surface of the glassware and, preferably, after initially melting as the zinc compound and/or magnesium compound.

As used herein, aqueous solutions are those including at least about fifty percent water. Various additives such as surfactants may be included, and particularly short chain alcohols such as ethanol and propanol may be included in substantial amounts.

While the mechanism of the instant invention is not entirely understood, it is postulated that the zinc and magnesium compounds are deposited as a solid upon the heated glassware as water is evaporated from the solution. The compounds initially melt and then pyrolytically decompose to form zinc oxide and/or magnesium oxide. Accordingly, if the original zinc or magnesium compound, or any intermediate zinc or magnesium compound other than zinc oxide or magnesium oxide formed during the course of pyrolytic decomposition, is stable at the temperature involved, satisfactory results will not be obtained. For instance, most magnesium compounds which are water soluble and include sulfur, i.e., magnesium sulfate heptahydrate $MgSO_4.7H_2O$, and other such magnesium compounds including sulfur, i.e., magnesium thiosulfate $MgS_2O_3.6H_2O$, magnesium sulphite $MgSO_3.6H_2O$ form, upon initial decomposition, magnesium sulfate $MgSO_4$ (decomposition temperature of about 1124° C.) are not workable. This temperature is above that to which glassware can usually be heated. Thus, the final coating is magnesium sulfate rather than magnesium oxide and does not display desireable "hot end" coating characteristics. However, such sulfur containing compounds would be expected to further pyrolyze to provide good results in some instances at higher temperatures with, for instance, ceramics.

Examples of zinc compounds and magnesium compounds which meet the above criteria and usable "hot end" coatings include magnesium acetate, magnesium nitrate, magnesium formate, magnesium perchlorate, magnesium chloride, zinc acetate, zinc formate, zinc nitrate, zinc perchlorate, and zinc chloride. Small amounts of zinc fluosilicate may be added to the above compounds and mixtures thereof. As mentioned earlier, the sulfur containing compounds generally are not decomposable to zinc oxide or magnesium oxide under the available temperatures.

Other magnesium compounds such as magnesium benzoate $Mg(C_7H_5O_2)_2.3H_2O$, magnesium lactate $Mg(C_3H_5O_3).3H_2O$, magnesium citrate $MgHC_6H_5O_7.5H_2O$ and magnesium dicitrate $Mg_2(C_6H_5O_7).5H_2O$ appear to be too insoluble to provide clear, adherent coatings. While coatings are formed, the coatings tend to be cloudy. This appears to be a function of the solubility of the magnesium compound. More soluble zinc and magnesium compounds, as discussed above, are believed to form small particles of the compound upon the glassware which particles are believed to immediately melt into a smooth continuous layer of the compound, and then pyrolytically decompose into zinc oxide or magnesium oxide. Water insoluble or marginally soluble zinc compounds and magnesium compounds do not usually yield the desired results, possibly because of the formation of solid particles in the presence of substantial quantities of water and which do not melt into a smooth layer prior to pyrolytic decomposition. Other mechanisms, such as ion exchange, may also be involved.

Of the zinc and magnesium compounds which satisfy the basic criteria, i.e., high water solubility, melting point below the general surface temperature of glass, and pyrolytic decomposition into zinc oxide or magnesium oxide at the surface temperature of the glass, zinc acetate and magnesium acetate are particularly preferred compositions having properties significantly superior to those of other of the operable zinc and magnesium compounds. For instance, magnesium acetate is highly soluble in water, generally employed at between 10 parts by weight of water to one part by weight of magnesium acetate to one part by weight of water to one part by weight of magnesium acetate, and typically at five parts by weight of water to one part by weight of magnesium acetate, melts at 80° C. and decomposes at 323° C., presumably into magnesium oxide. Upon decomposition, magnesium acetate forms water and carbon dioxide as byproducts. Magnesium oxide, magnesium acetate and the byproducts are all non-toxic and non-corrosive materials. Magnesium oxide formed by applying magnesium acetate in an aqueous solution to glassware may be produced at temperatures above about 400° C. to 450° C. However, the preferred range is between 425° C. to 650° C. Above about 680° C. to 700° C. the resulting "hot end" coating qualities diminish somewhat. Zinc acetate displays quite similar properties.

Magnesium nitrate forms worthwhile coatings from aqueous solutions but forms $NO_x$ by-products upon pyrolytic decomposition. However, magnesium nitrate melts at 89° C. and decomposes at 330° C. yielding coatings at normal "hot end" glass coating temperatures. Zinc chloride, zinc nitrate, zinc perchlorate, magnesium chloride and magnesium perchlorate produce acceptable coating, but again with usually objectionable byproducts.

The resulting zinc oxide and magnesium oxide "hot end" coatings in accord with the instant invention should, of course, be thick enough to afford coverage to the protected vitreous surface, such as glassware. However, in most instances, the coating should not be thicker than about one/half wavelength of light to which it is typically exposed, i.e., about one quarter micron, to avoid wave interference within the coating leading to iridesence. In some instances, coatings may be thicker without otherwise degrading the results. Iridesence, at times, may be considered a desirable appearance. Also, thicker coatings tend to be more electrically conductive. As a rule, the coating thickness may be easily controlled by regulating the solution flowrate and/or the exposure time of the heated glassware to a given concentration of the magnesium compound aqueous solution.

The zinc oxide and magnesium oxide coatings of the instant invention are not homogenous layers, but rather, include other compounds paticularly at the glass interface and the outer surface. However, the layers are predominantly zinc oxide or magnesium oxide.

As discussed above, the zinc compound and/or magnesium compound should be applied to a surface at a temperature of at least about 400° C., preferably between 425° C. and 650° C., though higher temperatures are suitable for coating purposes. In most instances though, the vitreous surface may be adversely affected by higher temperatures, though certain vitreous surfaces, such as ceramic, may be heated to quite elevated temperatures. Each compound suitable for forming zinc oxide and/or magnesium oxide coatings in accord with the instant invention of course displays differing melting points and pyrolytic decomposition points. Accordingly, optimum temperatures may vary somewhat from compound to compound, though the above specified temperatures are generally operable. For instance, zinc acetate and/or magnesium acetate are preferably applied between 425° C. and 650° C., though fair results may be obtained outside of this range.

The concentration of the zinc compound and/or magnesium compound in aqueous solution is not critical. Of course, more dilute solutions require evaporation of greater quantities of water and accordingly cool the glassware surface more. However, limited cooling often enhances results. As a rule, between about 10% to 50% by weight of zinc compound and/or magnesium compound to weight of solution has been found to be a desirable operating range, though not a critical range. Preferably about the midpoint of this range is employed. Solutions of mixed compounds, or those including alcohols, are often more viscous.

It should be noted that the solubility of the zinc compound and/or magnesium compound in water based solvents is an independent consideration from that of the actual concentration of the magnesium compounds in solution when applied to vitreous surfaces. Thus, compounds which marginally dissolve at the above-specified concentration are not necessarily desirable coating compounds. As the water evaporates, solid particles of the zinc and/or magnesium compound is of course formed on the vitreous surface. This result can be prematurely accomplished in near saturated solutions of zinc compounds and/or magnesium compounds. Accordingly, while not firmly established, it is believed that the more highly soluble zinc compounds and/or magnesium compounds operable in the instant invention do not form solid particles until but small amounts of water remain thereby minimizing the concurrent existance of solid matter and solution and leading to melting of the particles to form an initial coating.

It is contemplated that the zinc oxide and/or magnesium oxide coatings formed in accordance with the instant invention will be further coated with lubricious "cold end" coatings as are well known in the art. The oxide coatings per se are not lubricious and thus not protective. In combination with "cold end" coating outstanding protection is afforded. Generally, this is accomplished by spraying the lubricious coatings, usually as aqueous solutions, onto the vitreous surfaces after, in the case of glassware, annealing is substantially complete. Vapors of organic lubricious materials may also be employed to accomplish the coating. "Cold end" coatings are well known in the art. Typically such coatings include one or more lubricious constituent, such as waxy polyolefins, and particularly polyethylene having a molecular weight between 1000 and 2000, fatty acids such as oleic, plamitic, stearic, lauric, or mixtures thereof, alkali metal salts of fatty acids and polyvinyl alcohol. Such "cold end" coatings are well known in the art and are applicable to the zinc oxide and/or magnesium oxide coatings in accord with the instant invention. It appears that the zinc oxide and/or magnesium oxide coatings of the instant invention form chemical bonds with many "cold end" coatings and particularly with the fatty acids, while tin oxide forms only physical bonds.

A more detailed appreciation of the invention will be gained from the following examples.

EXAMPLE 1

An aqueous solution of magnesium acetate tetrahydrate was prepared by adding one part by weight of the magnesium acetate compound to five parts by weight of water. A glassware article (bottle) was heated to provide a surface temperature of about 640° C. The solution of magnesium acetate was sprayed at a flow rate of about 0.5 grams per second while the glassware was rotated upon a turntable at 78 rpm. Approximately 16 revolutions of the glassware bottle occurred during an application. A clear, transparent coating of magnesium oxide was formed on the bottle. Thereafter, when the glassware had cooled to 120° C., a commercial "cold end" coating, i.e., GLAS-LUBE 1000 available from Crown Chemical Company, diluted by a factor of 100 by weight in distilled water was sprayed at the rate of 1 gram of "cold end" coating solution per second for a period of 5 revolutions of the glassware on the turntable as discussed above. The thus coated article with both "hot end" and "cold end" coatings was tested for lubrication both wet and dry. Under both conditions lubrication was found to be excellent when two such glassware articles were manually rubbed together.

EXAMPLE 2

A glassware article was coated utilizing the same techniques and compositions as in Example 1 with the exception that the article was passed through a coating hood at the rate of about 0.8 feet per second while the aqueous solution of magnesium acetate was sprayed onto the article through four nozzles arranged to provide uniform coverage of the bottle on one pass through the coated hood. Results substantially identical to those of Example 1 were obtained.

Numerous other similar examples of coating of magnesium acetate were carried out with the following observations; excellent coatings were observed utilizing between about 10% by weight (actually 9.1%) of magnesium acetate to water to 50% by weight of magnesium acetate to water; technical grades of magnesium acetate and ordinary tap water were found to be entirely workable; and a preferred range of 425° C., to 650° C. was established.

EXAMPLE 3

4.1 parts by weight of water and 1 part by weight of magnesium nitrate hexahydrate were mixed to provide a solution of magnesium nitrate. The thus prepared solution of aqueous magnesium nitrate was applied to a glassware article utilizing substantially identical conditions as those employed in Example 1. The resulting "hot end" coating was transparent and attractive in appearance, and the article after "cold end" coating provided good lubrication both dry and wet when tested in a manner identical to that utilized in Example 1.

Other tests with magnesium nitrate were conducted with coating results substantially equal to those obtained with magnesium acetate, though lubrication qualities were poorer utilizing more dilute solutions, and were marginal at about 10% weight and below of magnesium nitrate to water solutions.

EXAMPLE 4

4.4 parts by weight of water and 1 part by weight of magnesium formate were mixed to form an aqueous solution of magnesium formate. The thus formed aqueous solution of magnesium formate was applied to a glassware article heated to a temperature of about 660° C. to 680° C. as described in Example 1. An attractive transparent coating was formed. "Cold end" coating was applied as described in Example 1 and the article tested for lubricity. Lubricity was found to be good when dry and fair wet. In general, magnesium formate was found to be an acceptable and desirable "hot end" coating material.

EXAMPLE 5

Ten parts by weight of water and 1 part by weight of magnesium sulfate were mixed to form a magnesium sulfate aqueous solution. The thus formed aqueous solution of magnesium sulfate was applied to a glassware article heated to about 720° C. and the article was otherwise treated and coated as described in Example 1. The "hot end" coating was spotty, the article, including additional "cold end" coating, displayed poor lubricity. It is believed that magnesium sulfate formed the coating. Thus, at the temperatures normally employed with glassware, magnesium sulfate was found to be unsatisfactory as having a decomposition point (about 1124° C.) above that of the working range of most glassware.

EXAMPLE 6

3.3 parts by weight of water was mixed with 1 part by weight of magnesium benzoate. The magnesium benzoate did not entirely dissolve in the water. The magnesium benzoate solution formed, which was more dilute than the initial consitituents, was decanted and applied to a glassware article heated to a temperature of about 640° C. in the manner described in Example 1. The resulting "hot end" coating was cloudy. After applying a "cold end" coating as described in Example 1, the article was tested for lubricity. The results were poor because of poor adhesion of the "hot end" coating. It was found that the "hot end" coating would wash off in water. It is believed that magnesium benzoate is not sufficiently soluble to form a clear, adherent coating as required of the magnesium compound in accord with the instant invention. Similar results were obtained with magnesium lactate, magnesium citrate, and magnesium dicitrate, all of which required decanting utilizing similar amounts of water and magnesium compounds.

EXAMPLE 7

A substantial number of newly formed glassware articles from an eight section double gob IS machine operating at a production rate of 166 bottles per minute were coated and tested. Various groups of otherwise identical bottles were coated only with "hot end" coatings according to the instant invention, only with "cold end" coatings, left uncoated and in combinations thereof. A first "hot end" coating of an aqueous solution of zinc acetate, including by weight, 13.4% zinc acetate, 0.87% glacial acetic acid and the remainder water, with 5 milliliters of Triton X100 surfactant added per gallon, was employed. Also, magnesium acetate solution of, by weight, 18.1% magnesium acetate, and the remainder water, Triton X100 surfactant added in the amount of 5 milliliters per gallon of mixture was utilized. The zinc acetate solution was sprayed on freshly formed bottles at the rate of 2.25 gallons per hour through 4 nozzles in opposed pairs, and the magnesium acetate solution was similarly applied at the rate of 1.75 gallons per hour. The glassware was then annealed in a conventional manner and a commercial "cold end" coating, i.e. Owens Illinois Duracoat, was applied to selected samples of the glassware articles. Certain of the glassware articles were removed at the end of the lehr prior to testing and case packing, while others were subjected to automatic testing and case packing.

The ware was tested utilizing a number of conventional commercial tests. The CTU determines the thickness of the "hot end" coating as a function of the index of refraction. Thereafter slip tests, in which the angle at which the static coefficient of friction is overcome by gravity by utilizing a tilting table were conducted. Tests were carried out according to industry standards. Scratch resistance was similarly determined in accord with industry standards utilizing a commercial scratch resistant tester. These tests measure the scratch resistance under load of the ware with the industry's standards calling for a minimum of 25 pounds resistance when wet. Burst tests were run in which the bottle was subjected to internal hydrostatic pressure until failure. The results are tabulated in the Tables below.

TABLE 1

|   | CTU | Slip :Dry | Slip :Wet | Scratch :Dry | Scratch :Wet |
|---|---|---|---|---|---|
| P:LP | 2–5; 3 Ave. | 40° | 42° | <5 lbs | <5 lbs |
| Abused P:LP | — | — | — | — | — |
| P/D:LP | 0 | 6° | 11° | 10 lbs | 5 lbs |
| P/D:CP | "0" | 12° | 15° | 20 lbs | 5 lbs |
| Mg:LP | 5–10; 6 Ave. | 42° | 42° | 5 lbs | 5 lbs |
| Mg/D:LP | 5–12; 7 Ave. | 10° | 9° | 70+ lbs | 70+ lbs |
| Mg/D:CP | 25–25; 25 Ave. | 11° | 13° | 70+ lbs | 70+ lbs |
| Zn:LP | 25–40; 31 Ave. | 41° | 38° | 5 lbs | 10 lbs |
| Zn/D:LP | 40–40; 40 Ave. | 11° | 9° | 70+ lbs | 70+ lbs |
| Zn/D:CP | 25–45; 36 Ave. | 13° | 10° | 70+ lbs | 70+ lbs |

P = Pristine
LP = Lehr Packed
CP = Case Packed
D = Cold End Coated
Mg = Magnesium Oxide Coating
Zn = Zinc Oxide Coating

TABLE 2

|   | N | B | S.D. | Low | N < 200 |
|---|---|---|---|---|---|
| P:LP | 60 | 321 | 121 | 112 | 9/60 = 0.15 |
| Abused P:LP | 48 | 283 | 129 | 117 | 20/48 = 0.42 |
| P/D:LP | 85 | 439 | 109 | 211 | 0/85 = 0.00 |
| P/D:CP | 94 | 367 | 86 | 168 | 3/94 = 0.03 |
| Mg:LP | 95 | 345 | 111 | 125 | 5/95 = 0.05 |
| Mg/D:LP | 94 | 462 | 93 | 235 | 0/94 = 0.00 |
| Mg/D:CP | 95 | 386 | 87 | 150 | 1/95 = 0.01 |
| Zn:LP | 91 | 363 | 129 | 107 | 9/91 = 0.10 |
| Zn/D:LP | 94 | 416 | 103 | 179 | 1/94 = 0.01 |
| Zn/D:CP | 93 | 407 | 98 | 193 | 1/93 = 0.01 |

P = Pristine
LP = Lehr Packed
CP = Case Packed
D = Cold End Coated
Mg = Magnesium Oxide Coating
Zn = Zinc Oxide Coating
N = Sample Number
B = Average Burst Pressure in psi
S.D. = Standard Deviation in psi
Low = Lowest Burst Pressure in psi
N<200 = Number Failing Below 200 psi From the results it will be apparent that "cold end" coated glassware without "hot end" coatings are deficient in the scratch test; and that glassware without any coating at all are also subject to seizure and scratching. Similarly, glassware having only "hot end" coatings are subject to seizure i.e. low lubricity, and to scratching. However, the glassware coated with the magnesium oxide or zinc oxide plus the "cold end" coating all display excellent lubricity as shown by the slip test, outstanding resistance to scratching, as well as an enhanced burst pressure i.e. relatively high. It will be recognized that lehr packed glassware, being less abused and less subject to incipient failure cracking, would be expected to display a higher burst pressure than, for instance, case packed ware which is jostled by automatic inspection equipment and packing equipment. Thus while lehr packed pristine glass having "cold end" coating displays a favorable average burst pressure, similar pristine "cold end" coated glassware which is case packed shows a significant deterioration in the average burst pressure while case packed "hot end" and "cold end" coated glassware, i.e., zinc oxide and magnesium oxide, both show superior burst pressure.

Numerous other tests were conducted to determine the characteristics of the "hot end" coating method of the instant invention, and of the resulting "hot end" coating.

For instance, newly formed glassware was coated with magnesium acetate, and with a 9 to 1 ratio by volume mixture of zinc acetate and magnesium acetate, substantially as described above. The glassware was purposely coated on the finished portion thereof filled with Tab. After storage, tests using uncoated ware as a standard, produced no indication of degraded torque removal or corrosion at the cap. In both cases, the preformance of the magnesium oxide and zinc oxide coatings were superior to that of tin oxide and titanium oxide.

Comparisons of the zinc oxide and magnesium oxide coatings of the instant invention, relative to the conventional tin oxide coating, were made with regard to adhesion of the "cold end" coatings thereto when exposed to hot water and caustic wash treatments. While such tests are not industry standards, on the basis of the test runs and discussions with those expert in the art, it was concluded that tin oxide coatings provide good results with waxy polyethylene coatings, but poor results, particularly in caustic solution at elevated temperatures, with fatty acids. On the other hand, the zinc oxide and magnesium oxide coatings of the instant invention appear to be somewhat less effective than tin oxide when utilized with waxy polyethylene lubricious coatings, but greatly superior thereto when utilized with fatty acid materials. On the basis of the observations, it is then postulated that the "hot end" coatings of the instant invention form a chemical bond with the fatty acid "cold end", thereby substantially enhancing the tenacity of the two coatings to the glass article. With this in mind, one skilled in the art may tailor "cold end" coatings to take advantage of this propensity for chemical bonding rather than, as has been done in the above testing, merely utilizing lubricious coatings which were tailored for tin oxide "hot end" coatings.

Other tests indicate that mixtures of appropriate zinc and magnesium compounds in an aqueous solution provide excellent results. Of the mixed compounds, a particularly useful ratio is that in which 85% to 90% by weight of the coating compound is zinc acetate and 10% to 15% by weight is magnesium acetate, though mixtures throughout the full range provide outstanding results. Coatings solution viscosity, at given concentrations of coating compound in aqueous solvent, are affected by the ratios. However, since coating has not been optimized with regard to application, other than to preferably utilize opposed atomizing spray nozzles for the solution on either side of a belt carrying the glass articles, the significance of viscosity is not great. Also, while, for purposes of the instant invention, aqueous solutions are defined as having at least 50% water in the solvent, improved results have been obtained by including amounts of up to 50% of short chain, i.e., one to four carbon atoms, alcohols. It has been inferred that the cooling afforded by the alcohol may somewhat improve the resulting "hot end" coating, but at the cost of a much more expensive solvent than water. Thus, lesser amounts of alcohols, i.e., on the order of 15% of the solvent, appear to be preferable when balancing the various considerations.

In summary, it has been found that zinc and magnesium compounds may be employed to form so-called "hot end" coatings on glass articles including ceramic materials. These refractory materials in themselves are not protective of, for instance, glassware but afford great protection when utilized in combination with so-call "cold end" coatings, such as organic lubricious coatings. Heretofore, only tin oxide and titanium oxide have been utilized as "hot end" coatings. Thus it was surprising to find that zinc oxide and magnesium oxide coatings, and mixtures thereof, afford results which in most significant areas are superior to those of tin oxide. Other than a possible "bloom" coating on magnesium oxide coated articles after extended storage, few shortcomings concerning the instant invention have been observed.

Though only several specific examples and embodiments of the present invention have been presented in detail, those skilled in the art will recognize numerous changes and modifications within the scope of the invention. Such changes may be made without parting from the scope of the invention, as defined by the following claims.

What is claimed is:

1. A method for forming protective coatings upon glass articles comprising:
   positioning a glass article heated to an elevated temperature within a coating location;
   applying an aqueous solution of a coating compound selected from the group consisting of magnesium compounds, zinc compounds and mixtures thereof upon the surface of the heated glass article;
   evaporating the solvent from the solution at the surface of the glass article;
   pyrolytically decomposing the remaining compound at the surface of the glass article to form a continuous, adherent and substantially transparent coating of the coated compound metal oxide upon the surface of the glass article;
   cooling the glass article and metal oxide coating thereon; and
   applying a second, lubricious coating thereto at a lower temperature.

2. A method for coating glass articles as set forth in claim 1 in which the surface of the glass article is at a temperature above 400° C.

3. A method for coating glass articles as set forth in claim 1 in which the surface of the glass article is at a temperature between about 425° C. and 650° C.

4. A method for coating glass articles as set forth in claim 1 in which the solution compound is melted after the water is substantially evaporated to form a coating of the solution compound upon the glass article surface and thereafter is pyrolyzed to form the coating of metal oxide.

5. A method for coating glass articles as set forth in claim 1 in which the aqueous solution is sprayed upon the surface of the glass articles in the form of a mist.

6. A method for coating glass articles as set forth in claim 1 in which the dissolved coating compound comprises between about 10% by weight and 50% by weight of the aqueous solution.

7. A method for coating glass articles as set forth in claim 1 in which the coating solution includes a mixture of coating compounds one of which is zinc fluosilcate in amounts not greater than about 30% by weight of the solution.

8. A method for coating glass articles as set forth in claim 1 in which the coating compound is highly soluble in water, has a melting point below the surface temperature of the glass articles, and a pyrolytic decomposition point below the surface temperature of the glass articles but above the melting point of the coating compound.

9. A method for coating glass articles as set forth in claim 8 in which the coating compound is selected from the group consisting of magnesium acetate, magnesium nitrate, magnesium formate, magnesium perchlorate, magnesium chloride, zinc acetate, zinc formate, zinc nitrate, zinc perchlorate and zinc chloride.

10. A method for coating glass articles as set forth in claim 9 in which the coating compound is magnesium acetate.

11. A method for coating glass articles as set forth in claim 10 in which the magnesium acetate is applied as a solution containing between 10% and 50% by weight of magnesium acetate relative to the solvent.

12. A method for coating glass articles as set forth in claim 10 in which the surface of the glass articles are at a temperature above about 400° C.

13. A method for coating glass articles as set forth in claim 10 in which the surface of the glass articles are at a temperature between about 425° C. and 650° C.

14. A method for coating glass articles as set forth in claim 9 in which the coating compound is zinc acetate.

15. A method for coating glass articles as set forth in claim 14 in which the zinc acetate is applied as a solution containing between 10% and 50% by weight of zinc acetate relative to the solvent.

16. A method for coating glass articles as set forth in claim 14 in which the surface of the glass articles are at a temperature above about 400° C.

17. A method for coating glass articles as set forth in claim 14 in which the surface of the glass articles are at a temperature between about 425° C. and 650° C.

18. A method for coating glass articles as set forth in claim 1 in which the aqueous solvent includes not more than 50% by volume of an alcohol.

19. A method for coating glass articles as set forth in claim 18 in which the alcohol contains 1 to 4 carbon atoms.

20. A method for coating glass articles as set forth in claim 1 in which the metal oxide coating is between about 0.1 micron and 1 micron thick.

21. A method for coating glass surfaces as set forth in claim 1 in which the lubricious coating includes at least one compound selected from the group consisting of waxy polylefins, beeswax, fatty acids, alkali metal salts of fatty acids, and polyvinyl alcohols.

22. A method for forming protective coatings on glass comprising:
spraying an aqueous solution of magnesium acetate onto the surface of glass at an elevated temperature;
evaporating the solvent from the aqueous solution of magnesium acetate at the surface of the glass;
pyrolytically decomposing the magnesium acetate at the surface of the glass to form a continuous, transparent film of magnesium oxide which tenaciously adheres to the surface of the glass;
cooling the glass article and magnesium oxide film thereon; and
applying a second, lubricious coating thereto at a lower temperature.

23. A method for forming a protective coating on glassware as set forth in claim 22 in which, the aqueous solution of magnesium acetate contains about 10% by weight to 50% by weight of magnesium acetate relative to the solvent, is applied as a spray to the glassware, and the surface of the glassware is at a temperature between about 425° C. And 650° C.

24. A method for forming protective coatings on glass comprising:
spraying an aqueous solution of zinc acetate onto the surface of glass at an elevated temperature;
evaporating the solvent from the aqueous solution of zinc acetate at the surface of the glass;
pyrolytically decomposing the zinc acetate at the surface of the glass to form a continuous, transparent film of zinc oxide which tenaciously adheres to the surface of the glass cooling the glass article and zinc oxide film thereon; and
applying a second, lubricious coating thereto at a lower temperature.

25. A method for forming a protective coating on glassware as set forth in claim 24 in which, the aqueous solution of zinc acetate contains about 10% by weight to 50% by weight of zinc acetate relative to the solvent, is applied as a spray to the glassware, and the surface of the glassware is at a temperature between about 425° C. and 650° C.

26. A method for forming protective coatings on glass comprising:
spraying an aqueous solution of magnesium acetate and zinc acetate onto the surface of glass at an elevated temperature;
evaporating the solvent from the aqueous solution of magnesium acetate and zinc acetate at the surface of the glass;
pyrolytically decomposing the magnesium acetate and zinc acetate at the surface of the glass to form a continuous, transparent film of magnesium oxide and zinc oxide which tenaciously adheres to the surface of the glass;
cooling the glass article and magnesium oxide and zinc oxide film thereon; and
applying a second, lubricious coating thereto at a lower temperature.

27. A method for forming a protective coating on glassware as set forth in claim 26 in which, the aqueous solution of magnesium acetate and zinc acetate contains about 10% by weight to 50% by weight of magnesium acetate and zinc acetate relative to the solvent, is applied as a spray to the glassware, and the surface of the glassware is at a temperature between about 425° C. and 650° C.

28. A glass article having protective and lubricious coatings thereon, said articles comprising:
a glass surface;
a metal oxide coating selected from the group consisting of transparent magnesium oxide, zinc oxide and mixtures thereof adhered directly to the surface; and
a lubricious coating of an organic compound adhered to the metal oxide.

29. A coated vitreous surface as set forth in claim 28 in which the lubricious coating includes at least one constituent selected from the group consisting of waxy polyolefins, beeswax, fatty acids, alkali metal salts of fatty acids, and polyvinyl alcohols.

30. A coated vitreous surface as set forth in claim 28 in which the metal oxide coating is not greater than one quarter micron thick.

31. Glassware having protective coatings thereon, the glassware comprising:
a glass surface;
a transparent, continuous, thin coating of magnesium oxide adhered to the glass surface; and
a lubricious coating including at least one constituent selected from the group consisting of waxy polyolefins, beeswax, fatty acids, alkali metal salts of fatty acids and polyvinyl alcohols adhered to the magnesium oxide coating.

32. Coated glassware as set forth in claim 31 in which the magnesium oxide coating is not greater than one quarter micron thick.

33. Glassware having protective coatings thereon, the glassware comprising:

a glass surface;

a transparent, continuous, thin coating of zinc oxide adhered to the glass surface; and a lubricious coating including at least one constituent selected from the group consisting of waxy polyolefins, beeswax, fatty acids, alkali metal salts of fatty acids and polyvinyl alcohols adhered to the zinc oxide coating.

34. Coated glassware as set forth in claim 33 in which the zinc oxide coating is not greater than one quarter micron thick.

35. Glassware having protective coatings thereon, the glassware comprising:

a glass surface;

a transparent, continuous, thin coating of zinc oxide and magnesium oxide adhered to the glass surface; and a lubricious coating including at least one constituent selected from the group consisting of waxy polyolefins, beeswax, fatty acids, alkali metal salts of fatty acids and polyvinyl alcohols adhered to the zinc oxide and magnesium oxide coating.

36. Coated glass ware as set forth in claim 35 in which the zinc oxide and the magnesium oxide coating is not greater than one quarter micron thick.

37. A method for forming protective coatings on glass articles, the method comprising:

positioning a glass article heated to an elevated temperature within a coating location;

applying a coating compound selected from the group consisting of magnesium compounds, zinc compounds and mixtures thereof to the surface of the heated glass article;

melting the coating compound to form a coating at the surface of the glass article;

pyrolytically decomposing the coating compound at the surface of the glass article to form a continuous, adherent and substantially transparent coating of the coating compound metal oxide upon the surface of the glass article; and applying a second lubricious coating to the metal oxide coating at a temperature below that at which pyrolytic decomposition takes place.

38. A method for coating glass articles as set forth in claim 37 in which the lubricious coating includes at least one compound selected from the group consisting of waxy polylefins, beeswax, fatty acids, alkali metal salts of fatty acids, and polyvinyl alcohols.

39. A method for coating glass articles as set forth in claim 37 in which the surface of the glass article is initially at a temperature above 400° C.

40. A method for coating glass articles as set forth in claim 39 in which the surface of the glass article is initially at a temperature between about 425° C. and 650° C.

41. A method for coating glass articles as set forth in claim 37 in which the coating compound is selected from the group consisting of magnesium acetate, magnesium nitrate, magnesium formate, magnesium perchlorate, magnesium chloride, zinc acetate, zinc formate, zinc nitrate, zinc perchlorate and zinc chloride.

42. A method for coating glass articles as set forth in claim 41 in which the coating compound is magnesium acetate.

43. A method of coating glass articles as set forth in claim 41 in which the coating compound is zinc acetate.

* * * * *